Oct. 21, 1952
A. T. MURRAY
2,614,791
SELF-RENEWING VALVE
Filed Feb. 10, 1948
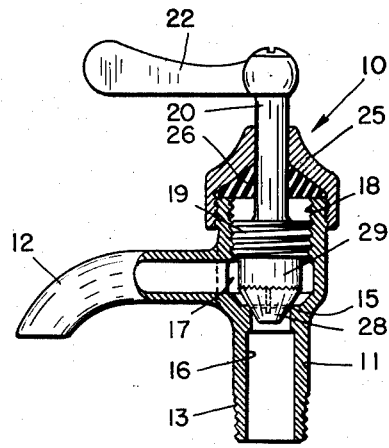
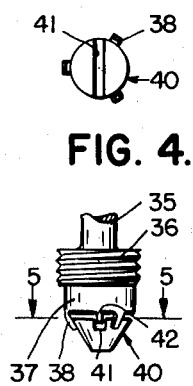
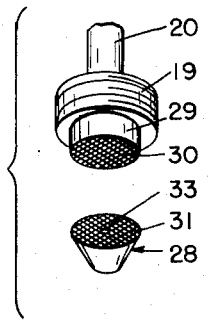
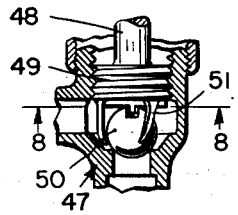
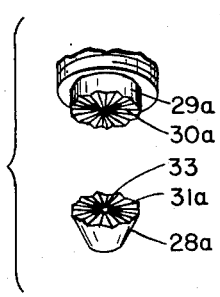
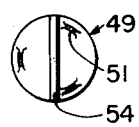
INVENTOR
ALFRED T. MURRAY
BY
*Mason & Graham*
ATTORNEYS Patented Oct. 21, 1952

2,614,791

UNITED STATES PATENT OFFICE 2,614,791

SELF-RENEWING VALVE

Alfred T. Murray, Pasadena, Calif.

Application February 10, 1948, Serial No. 7,343

3 Claims. (Cl. 251—37)

This invention has to do generally with valves, and more particularly with valves used in common household water faucets and the like.

An object of this invention is to provide a new and improved valve of simple construction especially adapted as a water faucet valve but having other uses.

A particular object is to provide a long wearing, leakproof valve in which the valve element and valve seat become more perfectly mated with usage.

A further object is to provide a valve which is initially easy to operate and which becomes easier to operate with continued usage.

Still another object of the invention is to provide a valve embodying a valve element and a valve seat in which the valve element in normal use is caused to reface the valve seat and its own seat contacting surface to produce a more perfect mating of the valve element and valve seat. Another object is the provision of such a valve in which the valve element is free and self-adjusting to any wear of the seat.

Another object of the invention is to provide a valve embodying a rotatable valve actuating stem and handle so constructed that over long periods of usage the handle will always occupy the same position when the valve is closed.

These and other objects will be apparent from the drawing and following description. Referring to the drawing:

Fig. 1 is a central longitudinal sectional view through a valve embodying the invention;

Fig. 2 is a perspective exploded view of the valve element and valve stem showing the adjacent ends of these elements;

Fig. 3 is a perspective exploded view of a modified form of valve element and valve stem;

Fig. 4 is a perspective exploded view of another form of valve element and valve stem;

Fig. 5 is a section on line 5—5 of Fig. 4;

Fig. 6 is a fragmentary sectional view through a valve embodying another form of the invention;

Fig. 7 is a plan view of the valve element of Fig. 6; and

Fig. 8 is a section on line 8—8 of Fig. 6.

More particularly describing the invention, reference numeral 10 generally indicates a faucet which includes a body 11 having a spout or outlet 12. The lower end of the body may be in any desired form and is shown as being provided with a threaded end portion 13.

The body 11 may be of brass or other suitable metal. The body is formed to provide a narrow valve seat 15, an inlet chamber or passage 16 therebelow and an outlet chamber 17 thereabove. The upper end of the body is internally threaded at 18 to receive a threaded section 19 of a valve stem generally indicated by 20. The upper end of the stem accommodates a handle 22 which may be mounted thereon in any suitable manner. A packing nut 25 serves to close the upper end of the body 11, being screwed thereon as shown against a packing 26 acting to seal around the stem.

A valve element 28 is provided which is preferably conical or frustro-conical in form. The valve element is seated on seat 15 through downward movement of the valve stem which includes a lower section 29 adapted to engage the valve element.

It is a particular feature of the invention that the valve element is free or floating so that it becomes automatically self-centering and that means are provided to slightly rotate the valve element on its seat during the final closing movement of the valve. This action is accomplished by providing the lower end surface 30 of the stem and the upper surface 31 of the valve element with suitable friction surfaces of one kind or another. In the form of the invention shown in Figs. 1 and 2, the surface 30 of the stem and the surface 31 of the valve element are each roughened or knurled. It is obvious that, when these surfaces engage as the stem is rotated to closing position, the valve element and stem will lock and rotation of the stem will serve to rotate the valve element on the seat, cleaning and refacing the same. The materials of the valve element and valve seat should preferably be of different hardness and both should be rust and corrosion proof in water. I prefer to make the valve element of a somewhat harder material than the material of the seat. Thus, a stainless steel valve element is particularly suitable for use with a brass seat.

While it is not essential to the invention, I provide a recess 33 in the upper end of the valve element which is preferably of a size to tightly receive a common wooden match stick which may be forced therein to remove the valve element should this ever be necessary.

In Fig. 3 I show another form of the invention wherein the valve stem 29a is provided with a friction surface 30a comprising radially extending serrations and the valve element 28a is provided with a similar surface 31a. It will be apparent that the surfaces 30a and 31a will engage during the closing action of the valve, causing rotation of the valve element on its seat, in the same manner as explained in connection with the form of the invention shown in Figs. 1 and 2.

By making the valve element of harder material than the material of the valve seat and by having the area of the valve seat surface relatively small, the valve element may more readily adapt the seat to its shape with less manual effort on the part of the operator and thus reface or renew the valve closure more easily.

Referring now to Figs. 4 and 5, reference numeral 35 indicates a valve stem with a threaded section 36 and a lower end portion 37. In this form of the invention fingers 38 are provided on the end 37 to loosely retain the valve element 40.

The valve element is provided with a groove or elongated recess 41 in its upper surface which is at all times engaged by a tongue lug or ridge 42 formed on the under surface of the valve stem. Preferably the recess 41 is considerably wider than the element 42. With this construction it will be apparent that the valve element 40, while held captive to the stem, at the same time is free to adjust itself to the seat. As the valve stem is screwed down the lower surface of the stem and the upper surface of the valve element engage and the valve element is forced on its seat and rotated thereon by the interengaging elements 41 and 42.

In Figs. 6-8 there is shown another form of the invention wherein a spherical valve element is used. Numeral 47 indicates a valve body which may be generally similar to valve body 11 of Fig. 1. In the body is shown a valve stem 48 provided with a lower threaded end section 49 adapted to engage corresponding threads in the body. A spherical valve element 50 is provided for engaging the seat in the body and this valve element is loosely held by fingers 51 on the end of the valve stem. The upper end of the valve element is provided with a recess 53 which is engaged at all times by a depending ridge or projection 54 on the lower end of the valve stem.

It will be apparent from the above description that, in operation, as the valve stem 48 is screwed into the valve body the valve element 50 will engage the seat and be rotated thereagainst, surfacing and refacing the seat during the final closing movement. At the same time the valve element is loose enough and free enough with relation to the stem to permit of its automatically adjusting itself to the seat.

Although the invention has been particularly shown and described, various changes and modifications can be made without departing from the scope of the invention as set forth in the following claims.

I claim:

1. A valve comprising a valve body having an inlet and an outlet and providing an annular valve seat therebetween, a valve stem mounted in said body for axial movement toward and away from said seat, a self-centering valve element between the inner end of said stem and said seat, said valve element having a transverse groove facing the inner end of said stem, said valve stem being provided with an inwardly projecting tongue on its inner end for reception in said groove, said tongue having a transverse dimension and depth sufficiently less than the width and depth of the groove to permit limited movement of the valve element axially and rotatively with respect to the stem, and means on said stem for loosely holding said valve element.

2. A valve as defined in claim 1 in which said valve element is ball-like in shape.

3. A valve as defined in claim 1 in which said valve element is frustro-conical in shape.

ALFRED T. MURRAY.

REFERENCES CITED

The following references are of record in the file of this patent:

UNITED STATES PATENTS

| Number | Name | Date |
|---|---|---|
| 628,999 | Waltz | July 18, 1899 |
| 767,600 | Sjoberg | Aug. 16, 1904 |
| 1,021,758 | Bosse | Apr. 2, 1912 |
| 1,177,337 | Johnson | Mar. 28, 1916 |
| 1,296,897 | Yoemans | Mar. 11, 1919 |
| 1,322,200 | Reiley | Nov. 18, 1919 |
| 1,612,533 | Poindexter | Dec. 28, 1926 |
| 1,934,486 | Carlson | Nov. 7, 1933 |

FOREIGN PATENTS

| Number | Country | Date |
|---|---|---|
| 177,046 | Great Britain | of 1922 |